United States Patent
Zhou et al.

(10) Patent No.: US 6,650,517 B2
(45) Date of Patent: Nov. 18, 2003

(54) BALLAST SAFETY CIRCUIT

(75) Inventors: Zhengguo Zhou, Shanghai (CN); Shihua Shen, Shanghai (CN); Hui Jiang, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/055,793

(22) Filed: Jan. 22, 2002

(65) Prior Publication Data
US 2003/0137252 A1 Jul. 24, 2003

(51) Int. Cl.$^7$ .................................................. H02H 3/33
(52) U.S. Cl. .......................................................... 361/45
(58) Field of Search ............................. 361/42, 45, 44, 361/48, 50, 87; 315/307

(56) References Cited

U.S. PATENT DOCUMENTS

| | | |
|---|---|---|
| 4,044,395 A * | 8/1977 | Eckart .......................... 361/44 |
| 4,507,698 A | 3/1985 | Nilssen |
| 4,563,719 A | 1/1986 | Nilssen |
| 4,663,571 A | 5/1987 | Nilssen |
| 4,855,860 A | 8/1989 | Nilssen |
| 5,065,074 A | 11/1991 | Hesketh et al. |
| 5,334,912 A | 8/1994 | Counts |
| 5,363,018 A | 11/1994 | Shackle |
| 5,461,287 A | 10/1995 | Russell et al. .......... 315/209 R |
| 5,680,286 A | 10/1997 | Pacholok |

* cited by examiner

Primary Examiner—Gregory J. Toatley, Jr.
Assistant Examiner—Boris Benenson

(57) ABSTRACT

A ballast safety circuit is disclosed. The ballast safety circuit includes a sensor in the form a toroid that includes a pair of coil windings for coupling to a pair of input lines on an input side of a ballast. The toroid further includes a third coil winding for detecting a leakage current flowing through one of the input lines when a person is attempting to mount a lamp on the ballast. Upon detection of the leakage current, the ballast safety circuit impeded an operation of the lamp to thereby dissipate the leakage current whereby the person can safely complete the mounting of the lamp on the ballast.

3 Claims, 1 Drawing Sheet

BALLAST SAFETY CIRCUIT

BACKGROUND OF THE INVENTION

1. Field of the Invention

The present invention generally relates to an operation of a ballast. The present invention specifically relates to ground fault detectors on the input side of a ballast.

2. Description of the Related Art

Currently, an isolated safety circuit on the output side of a ballast are employed to protect a person from shock when installing lamps. For example, U.S. Pat. No. 4,563,719, U.S. Pat. No. 4,663,571, and U.S. Pat. No. 4,855,860 are all directed toward an isolated safety circuit on the output side of a ballast. However, a drawback to this mode of protection is the sensitivity of the circuit to potential shock as related to an activation threshold that may still result in an uncomfortable electric sting being felt by the person of a non-isolated ballast. The present invention is an improvement over the prior art.

SUMMARY OF THE INVENTION

The present invention is a ballast safety circuit. Various aspects of the present invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a device comprising a ballast and a ballast safety circuit. The ballast has a first input line and a second input line. The ballast safety circuit is in electrical communication with the first input line and the second input line where the ballast safety circuit is operable to detect an occurrence of a leakage current flowing through the second input line when a person is attempting to a mount a lamp on the ballast. In one embodiment, the ballast safety circuit includes a magnetic core, a first coil winding wound around the magnetic core, a second coil winding wound around the magnetic core, and a third coil winding wound around the magnetic core. The first coil winding is in electric communication with the first input line. The second coil winding is in electric communication with a second input line of the ballast. The third coil winding is operable to detect the leakage current flowing through the second input line.

The foregoing form as well as other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENTLY PREFERRED EMBODIMENTS

Figure 1:
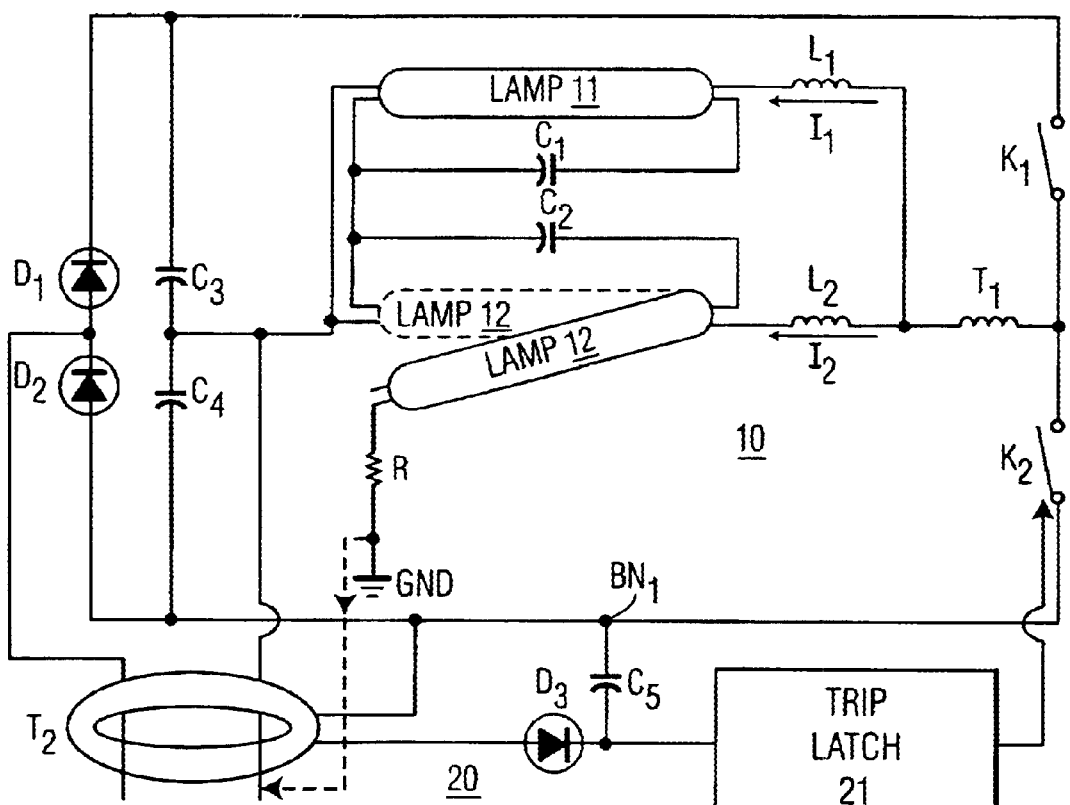
FIG. 1 illustrates one embodiment of a ballast safety circuit in accordance with the present invention.

FIG. 1 illustrates a conventional ballast 10 and a ballast safety circuit 20 of the present invention. Ballast 10 includes a pair of diodes $D_1$ and $D_2$ representative of an input rectification circuit coupled in an input line L. Ballast 10 further includes a pair of capacitors $C_3$ and $C_4$ representative of a DC stable source coupled to an input line N. In normal operation, a capacitor $C_1$ and an inductor $L_1$ resonate to control an operating current $I_1$ when a lamp 11 is mounted on the ballast 10 as shown. Additionally, a capacitor $C_2$ and an inductor $L_2$ resonate to control an operating current $I_2$ when a lamp 12 is mounted on the ballast 10 as shown by the dashed version of the lamp 12. A toroid $T_1$ drives an electronic switch $K_1$ and an electronic switch $K_2$ to operate the lamp 11 and the lamp 12.

In a circumstance where the lamp 11 is operating and a person (represented by a resistor R) is attempting to mount lamp 12 as shown, a leakage current (represented by the dashed arrow) can flow through the resistor R to the input line N. The leakage current is typically inadequate to operate lamp 12, but adequate to cause a voltage drop across the resistor R that can be harmful to the person. Ballast safety circuit 20 operates to dissipate the leakage current during a detection of the leakage current to thereby protect the person.

Figure 2:
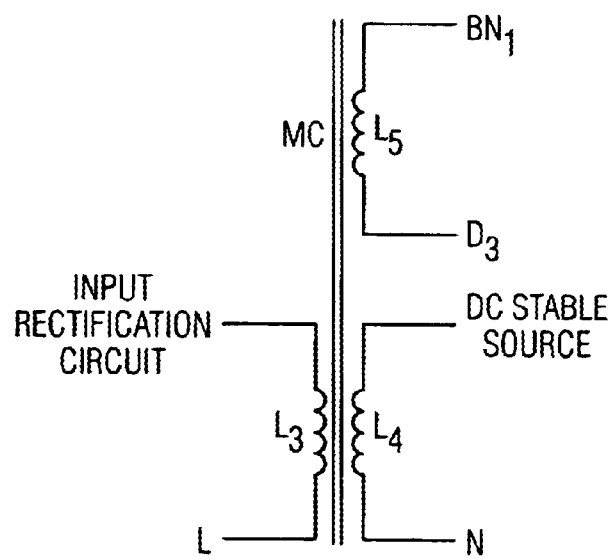
FIG. 2 illustrates one embodiment of a toroid in accordance with the present invention.

Ballast safety circuit 20 includes a toroid $T_2$, a diode D3, a capacitor C5, and a trip latch 21 in the form of a conventional transistor based circuit. FIG. 2 illustrates one embodiment of toroid $T_2$ having a magnetic core MC, a coil winding $L_3$, a coil winding $L_4$, and a coil winding $L_5$. Coil winding $L_3$ is coupled to an input line L and is in electric communication with the input rectification circuit (FIG. 1) represented by diode $D_1$ and diode $D_2$. Coil winding $L_4$ is coupled to input line N and is in electric communication with the DC stable source (FIG. 1) represented by capacitor $C_3$ and capacitor $C_4$. Coil winding $L_5$ is coupled a diode $D_3$ and is in electric communication with the input rectification circuit, the DC stable source and electronic switch $K_2$ (FIG. 1) via a base node $BN_1$. Diode $D_3$ is coupled to a capacitor $C_5$ and a trip latch 21. Capacitor $C_5$ is further coupled to base node $BN_1$.

Referring to FIGS. 1 and 2, in operation, magnetic core MC is prohibited from inducting a normal input current in input line L and input line N, because the induction is opposed. A leakage current, if any, will flow through input line N causing a current differential between input line L and input line N. Coil winding $L_5$ detects the leakage current, and in response thereto, provides a detection signal (not shown) to trip latch 21. During a reception of the detection signal, trip latch 21 impedes an operation of lamp 12 by latching open electronic switch $K_2$. The result is an expediently dissipation of the leakage current whereby a person mounting lamp 12 does not feel the leakage current.

In one embodiment, the number of turns $N_1$ of coil winding $L_3$ and/or coil winding $L_4$, and the number of turns $N_2$ of coil winding $L_5$ are in accordance with the following equation [1]:

$$N_2 = (L*U)/(N_1*f*A*\mu*I) \quad [1]$$

L is the length of a magnetic path in the toroid $T_2$, U is a trip voltage to latch open electronic switch $K_2$, f is an exciting current frequency, A is the cross-section of magnetic core MC, $\mu$ is the permeability of magnetic core MC, and I is the leakage current. Exciting current frequency f and leakage current I are measured under the assumption resistor R (FIG. 1) is 500 ohms. Trip voltage U is determined from an operational specification of electronic switch $K_2$. Cross-section A and $\mu$ are determined from the dimensions and material of magnetic core MC. Turns $N_1$ and turns $N_2$ can therefore be selected to maximize the efficiency of toroid $T_2$.

Referring to FIG. 1, ballast 10 was utilized to facilitate an explanation of ballast safety circuit 20 in accordance with the present invention. Those having ordinary skill in the art will appreciate from this explanation that a ballast safety circuit in accordance with the present invention (e.g., ballast safety circuit 20) can be employed with any type of ballast having at least two input lines. As such, for some types of ballasts, the leakage current may flow from resistor R to the input line L (FIG. 1).

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. A ballast safety circuit, comprising:

a magnetic core;

a first coil wound on said magnetic core, said first coil coupled to a first input line of a ballast;

a second coil wound on said magnetic core, said second coil coupled to a second input line of the ballast;

a third coil wound on said magnetic core, said third coil detecting a current imbalance between said first coil and said second coil;

wherein the number of turns, N, of said third coil is a function of a number of turns of either the first coil or the second coil according to the following relation, $$N=(L*U)/(N_1*f*A*\mu*I).$$

2. The ballast safety circuit of claim 1, further comprising:

a trip latch coupled to said third coil and responding to said current imbalance by impeding an operation of a lamp coupled to said ballast.

3. An electronic ballast for driving one or more gas discharge lamps, said ballast comprising:

a magnetic core;

a first coil wound on said magnetic core, said first coil coupled to a first input line of a ballast;

a second coil wound on said magnetic core, said second coil coupled to a second input line of the ballast;

a third coil wound on said magnetic core, said third coil detecting a current imbalance between said first coil and said second coil;

wherein the number of turns, N, of said third coil is a function of a number of turns of either the first coil or the second coil according to the following relation, $$N=(L*U)/(N_1*f*A*\mu*I);$$

a series resonant, half bridge output; and a trip latch coupled to said third coil for impeding the operation of said output.

* * * * *